(12) United States Patent
Guo et al.

(10) Patent No.: US 11,067,503 B2
(45) Date of Patent: Jul. 20, 2021

(54) LENS ASSEMBLY, TERAHERTZ WAVE TOMOGRAPHY SYSTEM AND METHOD, AND TERAHERTZ WAVE FILTER

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Lanjun Guo, Beijing (CN); Chunlei Wang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/639,849

(22) PCT Filed: Jun. 20, 2019

(86) PCT No.: PCT/CN2019/092063
§ 371 (c)(1),
(2) Date: Feb. 18, 2020

(87) PCT Pub. No.: WO2020/029691
PCT Pub. Date: Feb. 13, 2020

(65) Prior Publication Data
US 2020/0363330 A1    Nov. 19, 2020

(30) Foreign Application Priority Data

Aug. 7, 2018   (CN) .......................... 201810890496.2

(51) Int. Cl.
*G01N 21/3581*   (2014.01)
*H01Q 15/02*   (2006.01)
(Continued)

(52) U.S. Cl.
CPC ....... *G01N 21/3581* (2013.01); *G02F 1/1343* (2013.01); *H01Q 15/02* (2013.01);
(Continued)

(58) Field of Classification Search
CPC ....... G01N 21/3581; G01N 2021/1787; G01N 2201/0633; G02F 1/1343; H01Q 15/02; H01Q 19/065; G02B 3/14
See application file for complete search history.

(56) References Cited

U.S. PATENT DOCUMENTS

| 4,909,626 A | 3/1990 | Purvis et al. |
| 6,449,081 B1 | 9/2002 | Onuki et al. |

(Continued)

FOREIGN PATENT DOCUMENTS

| CN | 101501534 A | 8/2009 |
| CN | 102608814 A * | 7/2012 |

(Continued)

*Primary Examiner* — Michael C Bryant
(74) *Attorney, Agent, or Firm* — The Webb Law Firm (57) ABSTRACT

The present disclosure provides a lens assembly, a terahertz wave tomography system and method, and a terahertz wave filter. The lens assembly includes: a first substrate and a second substrate that are oppositely disposed; a seal, wherein the seal, the first substrate and the second substrate enclose a cavity in which a magnetic fluid is filled; and a plurality of electromagnetic generating units disposed on at least one of a first side of the first substrate close to the second substrate or a second side of the first substrate away from the second substrate, wherein at least a part of the plurality of electromagnetic generating units are configured to generate a magnetic field in a case where a voltage is applied to make the magnetic fluid form a Fresnel zone plate pattern.

20 Claims, 7 Drawing Sheets

(51) Int. Cl.
*G02F 1/1343* (2006.01)
*G01N 21/17* (2006.01)

(52) U.S. Cl.
CPC ............... *G01N 2021/1787* (2013.01); *G01N 2201/0633* (2013.01)

(56) References Cited

U.S. PATENT DOCUMENTS

2010/0232030 A1    9/2010  Dobrusskin
2012/0026599 A1    2/2012  Hirsa et al.

FOREIGN PATENT DOCUMENTS

| | | | | |
|---|---|---|---|---|
| CN | 102608814 A | | 7/2012 | |
| CN | 103038672 A | * | 4/2013 | ....... B29D 11/00461 |
| CN | 103038672 A | | 4/2013 | |
| CN | 106338498 A | * | 1/2017 | ............ G01N 21/01 |
| CN | 106338498 A | | 1/2017 | |
| CN | 106591787 A | | 4/2017 | |
| JP | H06130351 A | | 5/1994 | |

\* cited by examiner

LENS ASSEMBLY, TERAHERTZ WAVE TOMOGRAPHY SYSTEM AND METHOD, AND TERAHERTZ WAVE FILTER

CROSS-REFERENCE TO RELATED APPLICATIONS

The present application is a U.S. National Stage Application under 35 U.S.C. § 371 of International Patent Application No. PCT/CN2019/092063, filed on Jun. 20, 2019, which claims priority to Chinese Patent Application 201810890496.2 filed on Aug. 7, 2018, the disclosure of both of which are incorporated by reference herein in its entirety.

TECHNICAL FIELD

The present disclosure relates to a lens assembly, a terahertz wave tomography system, a terahertz wave tomography method, and a terahertz wave filter.

BACKGROUND

With the development of terahertz technology, terahertz waves have been widely applied in many fields, such as biopsy detection, non-destructive detection, security inspection, and security communication. In many applications of terahertz waves, terahertz waves need to be collected or focused.

SUMMARY

According to one aspect of embodiments of the present disclosure, a lens assembly is provided. The lens assembly comprises: a first substrate and a second substrate that are oppositely disposed; a seal, which encloses a cavity with the first substrate and the second substrate, wherein a magnetic fluid is filled in the cavity; and a plurality of electromagnetic generating units disposed on at least one of a first side of the first substrate close to the second substrate or a second side of the first substrate away from the second substrate, wherein at least a part of the plurality of electromagnetic generating units are configured to generate a magnetic field, in a case where a voltage is applied, to make the magnetic fluid form a Fresnel zone plate pattern.

In some embodiments, wherein at least one of the plurality of electromagnetic generating units comprises a solenoid.

In some embodiments, orthographic projections of the plurality of electromagnetic generating units on the first substrate are arranged in concentric rings.

In some embodiments, the orthographic projections of the plurality of electromagnetic generating units on the first substrate are arranged in the Fresnel zone plate pattern.

In some embodiments, orthographic projections of the plurality of electromagnetic generating units on the first substrate are arranged in a matrix.

In some embodiments, at least one of the plurality of electromagnetic generating units is disposed on the first side; and wherein the lens assembly further comprises: a first insulating layer disposed between the at least one of the plurality of electromagnetic generating units and the magnetic fluid and covering the at least one electromagnetic generating unit.

In some embodiments, the lens assembly further comprises: a second insulating layer disposed between the second substrate and the magnetic fluid.

In some embodiments, at least one of the plurality of electromagnetic generating units is disposed on the second side; and wherein the lens assembly further comprises: a protective layer covering the at least one of the plurality of electromagnetic generating units.

In some embodiments, the plurality of electromagnetic generating units is disposed symmetrically with respect to the first substrate.

In some embodiments, a direction of the magnetic field is perpendicular to a plane where the first substrate is located.

In some embodiments, a plurality of thin film transistors is disposed in the first substrate, and each of plurality of thin film transistors is connected to at least one of the plurality of electromagnetic generating units.

In some embodiments, the plurality of electromagnetic generating units is disposed on a side of the second substrate close to the first substrate, and at least one of the first side or the second side.

In some embodiments, the plurality of electromagnetic generating units is disposed on the side of the second substrate close to the first substrate and the first side.

According to another aspect of embodiments of the present disclosure, a terahertz wave tomography system is provided. The terahertz wave tomography system comprises the lens assembly according to any one of the above embodiments, configured to receive a first terahertz wave and focus a second terahertz wave transmitted through the lens assembly at a position to be imaged of a sample to be imaged.

In some embodiments, the terahertz wave tomography system further comprises: a transmitter configured to transmit the first terahertz wave to the lens assembly; and a processing device configured to receive and process a third terahertz wave transmitted through the sample to be imaged to obtain an image of the position to be imaged.

In some embodiments, the processing device comprises: a collimator configured to collimate the third terahertz wave transmitted through the sample to be imaged; a focuser configured to focus the third terahertz wave collimated by the collimator; a receiver configured to receive the third terahertz wave focused by the focuser; and a processor configured to process the terahertz wave focused by the focuser to obtain the image of the position to be imaged.

According to still another aspect of embodiments of the present disclosure, a terahertz wave filter is provided. The terahertz wave filter comprises the lens assembly according to any one of the above embodiments and an aperture stop located on a light exiting side of the lens assembly, wherein the lens assembly is configured to receive terahertz waves of a plurality of wavelengths and focus a terahertz wave of a predetermined wavelength of the terahertz waves of the plurality of wavelengths at the aperture stop.

According to yet still another aspect of embodiments of the present disclosure, a terahertz wave tomography method is provided. The terahertz wave tomography method comprises: transmitting a first terahertz wave to the lens assembly according to any one of the above embodiments; applying the voltage to at least a part of the plurality of electromagnetic generating units to make the magnetic fluid form the Fresnel zone plate pattern, thereby making a second terahertz wave transmitted through the lens assembly focus at a position to be imaged of a sample to be imaged; and receiving and processing a third terahertz wave transmitted through the sample to be imaged to obtain an image of the position to be imaged.

In some embodiments, the at least a part of the plurality of electromagnetic generating units and other electromagnetic generating units of the plurality of electromagnetic generating units with no voltage applied are distributed in the Fresnel zone plate pattern.

In some embodiments, the position to be imaged comprises a first position to be imaged and a second position to be imaged; and wherein the step of applying the voltage comprises: applying the voltage to a first part of the at least a part of the plurality of electromagnetic generating units to make the magnetic fluid form a first Fresnel zone plate pattern, thereby making the second terahertz wave transmitted through the lens assembly focus at the first position to be imaged of the sample to be imaged; and applying the voltage to a second part of the at least a part of the plurality of electromagnetic generating units to make the magnetic fluid form a second Fresnel zone plate pattern, thereby making the second terahertz wave transmitted through the lens assembly focus at the second position to be imaged of the sample to be imaged, wherein the second part of the at least a part of the plurality of electromagnetic generating units comprise at least one electromagnetic generating unit different from each of the first part of the at least a part of the plurality of electromagnetic generating units, so that a radius of a first half wave zone of the second Fresnel zone plate pattern is different from a radius of a first half wave zone of the first Fresnel zone plate pattern.

Other features, aspects and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

It should be understood that the dimensions of the various parts shown in the accompanying drawings are not necessarily drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors have noticed that, the lens for focusing the terahertz wave in the related art has a fixed focal length, such a lens cannot be applied to tomography.

In view of this, embodiments of the present disclosure provide a lens assembly with a variable focal length.

Figure 1A:
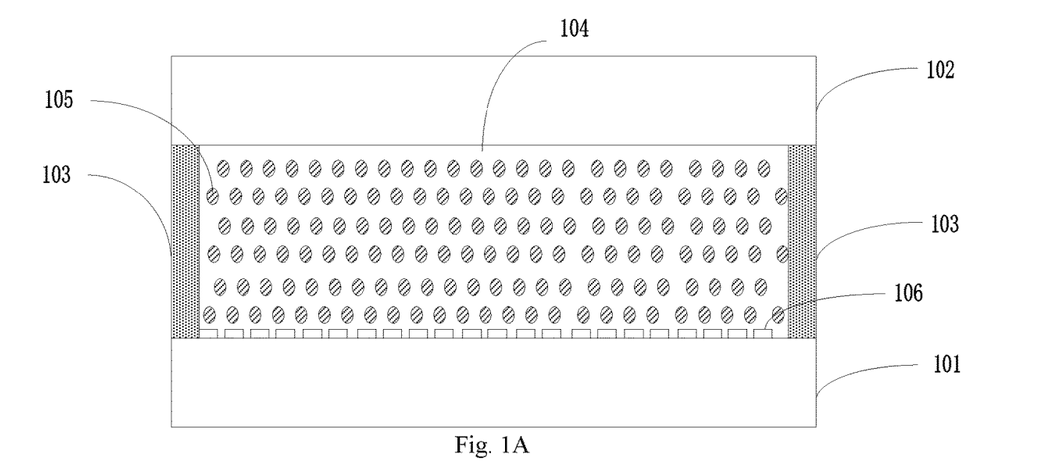
FIG. 1A is a schematic structural view showing a lens assembly according to an embodiment of the present disclosure.
Figure 1B:
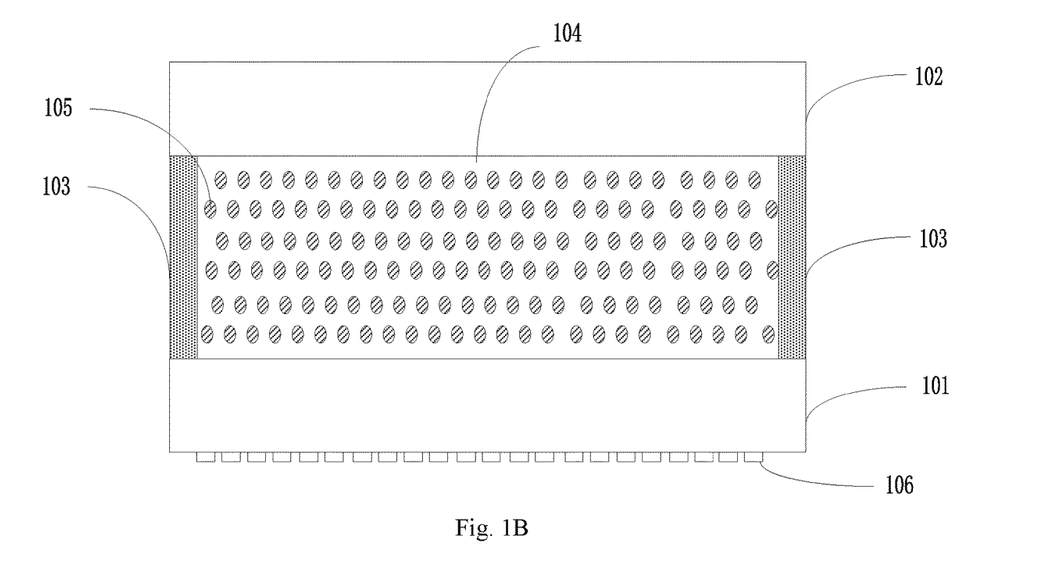
FIG. 1B is a schematic structural view showing a lens assembly according to another embodiment of the present disclosure.
Figure 1C:
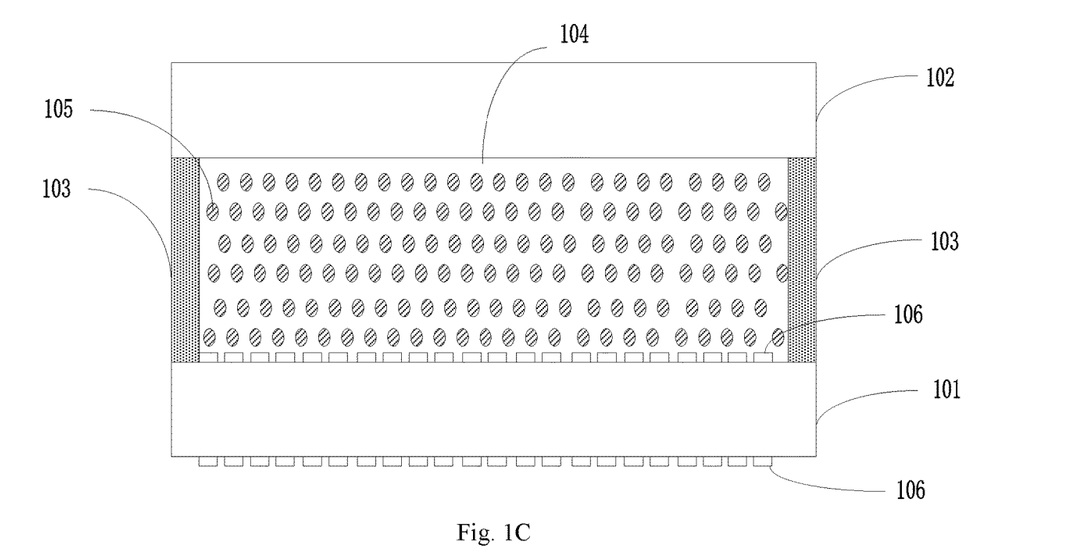
FIG. 1C is a schematic structural view showing a lens assembly according to still another embodiment of the present disclosure.

FIG. 1A is a schematic structural view showing a lens assembly according to an embodiment of the present disclosure. FIG. 1B is a schematic structural view showing a lens assembly according to another embodiment of the present disclosure. FIG. 1C is a schematic structural view showing a lens assembly according to still another embodiment of the present disclosure.

As shown in FIGS. 1A, 1B, and 1C, the lens assembly comprises a first substrate 101 and a second substrate 102 that are oppositely disposed. Here, the first substrate 101 and the second substrate 102 are spaced apart from each other. In some embodiments, the first substrate 101 and the second substrate 102 are glass substrates.

The lens assembly also comprises a seal 103 such as a sealant or the like. The seal 103, the first substrate 101 and the second substrate 102 enclose a cavity 104 in which a magnetic fluid 105 is filled. In some embodiments, the magnetic fluid may comprise magnetic particles such as $Fe_2O_3$, $Fe_3O_4$, nickel or cobalt, and liquids such as water, organic solvent or oil. In some embodiments, the magnetic fluid may further comprise an active agent such as oleic acid to prevent agglomeration of the magnetic particles.

In some embodiments, the cavity 104 may be a column, such as a cylinder, a prism, or the like. In this case, the seal 103 is a lateral surface of the column, and the first substrate 101 and the second substrate 102 are two bottom surfaces of the column. It should be understood that, the cavity 104 is not limited to a column. For example, the first substrate 101 and the second substrate 102 may be non-parallel, so that the cavity 104 is of an irregular shape.

The lens assembly further comprises a plurality of electromagnetic generating units 106. The plurality of electromagnetic generating units 106 is disposed on at least one of a side (also referred to as a first side) of the first substrate 101 close to the second substrate 102 or a side (also referred to as a second side) away from the second substrate 102. At least a part of the plurality of electromagnetic generating units 106 are configured to generate a magnetic field, in a case where a voltage is applied, to make the magnetic fluid 105 form a Fresnel zone plate pattern. For example, a voltage may be applied to a part of the plurality of electromagnetic generating units 106 so that among the plurality of electromagnetic generating units 106, electromagnetic generating units 106 with a voltage applied and the other electromagnetic generating units 106 with no voltage applied are distributed in a Fresnel zone plate pattern. For another example, the plurality of electromagnetic generating units 106 may be arranged to be distributed in a Fresnel zone plate pattern. In this case, a voltage may be applied to all of the plurality of electromagnetic generating units 106.

In some embodiments, as shown in FIG. 1A, the plurality of electromagnetic generating units 106 are all disposed on the first side of the first substrate 101 close to the second substrate 102.

In other embodiments, as shown in FIG. 1B, the plurality of electromagnetic generating units 106 are all disposed on the second side of the first substrate 101 away from the second substrate 102.

In further embodiments, as shown in FIG. 1C, a part of the plurality of electromagnetic generating units 106 are disposed on the first side of the first substrate 101 close to the second substrate 102, and other electromagnetic generating units 106 are disposed on the second side of the first substrate 101 away from the second substrate 102.

In some implementations, at least one of the plurality of electromagnetic generating units 106 is disposed on the second side. In this case, the lens assembly may further comprise a protective layer such as plastic on the second side, the protective layer covering the electromagnetic generating unit 106 located on the second side. The protective layer may prevent the electromagnetic generating unit 106 disposed on the second side from being affected by ambient environment, for example, from being oxidized.

In the above embodiments, at least a part of the plurality of electromagnetic generating units can generate a magnetic field in a case where a voltage is applied, so that the magnetic fluid forms a Fresnel zone plate pattern. By controlling the voltage applied to the plurality of electromagnetic generating units, the distribution of the magnetic fluid can be changed so that radii of half wave zones of the Fresnel zone plate pattern formed by the magnetic fluid are changed, and thus the focal length of the lens assembly is changed. The focal length of such a lens assembly can be conveniently adjusted.

Figure 2A:
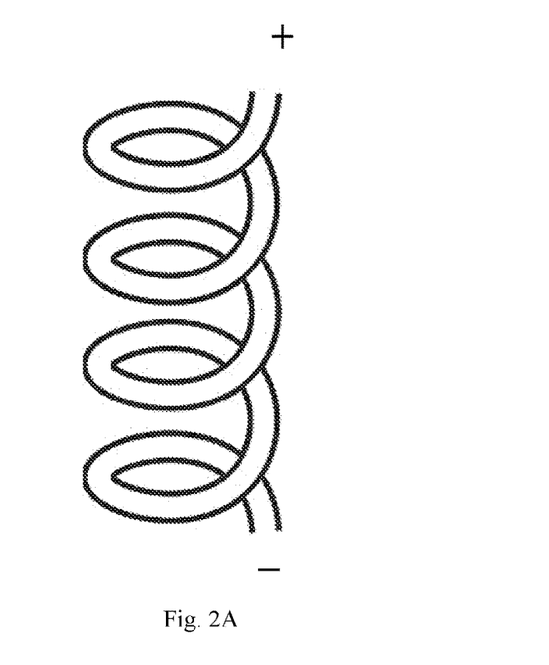
FIG. 2A is a schematic structural view showing an electromagnetic generating unit according to an embodiment of the present disclosure.

FIG. 2A is a schematic structural view showing an electromagnetic generating unit according to an embodiment of the present disclosure.

As shown in FIG. 2A, the electromagnetic generating unit 106 may be a solenoid. The number of spiral turns of the solenoid may be, for example, one or more than one. The coil in the solenoid may be in a shape of circular, square, rectangular, or the like.

Figure 2B:
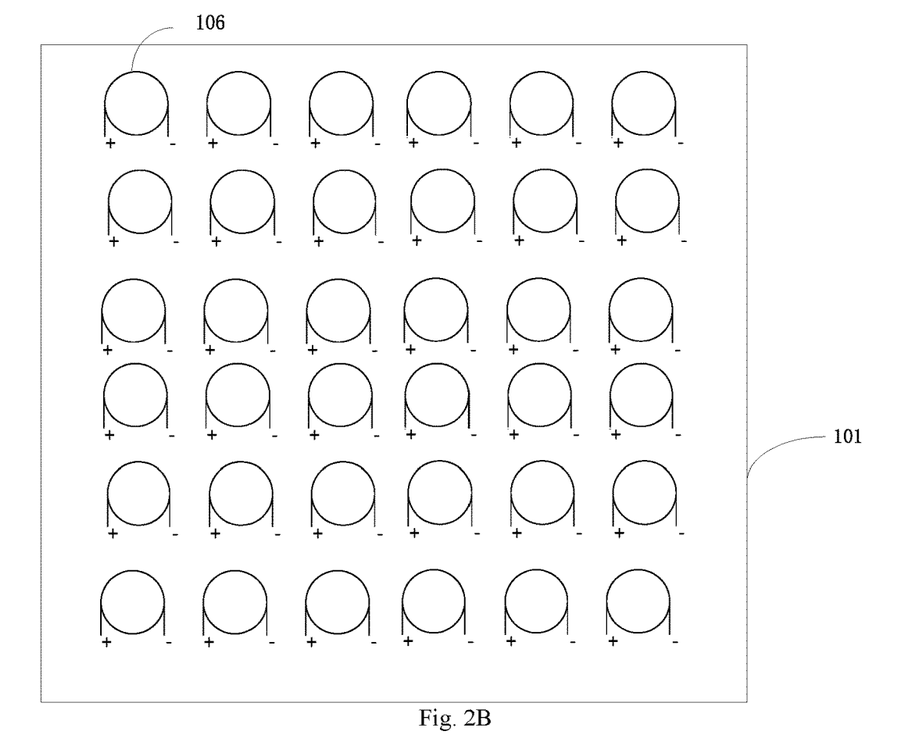
FIG. 2B shows an arrangement manner of a plurality of electromagnetic generating units according to an embodiment of the present disclosure.

FIG. 2B shows an arrangement manner of a plurality of electromagnetic generating units 106 according to an embodiment of the present disclosure. Here, FIG. 2B shows an arrangement manner of orthographic projections of the plurality of electromagnetic generating units 106 on the first substrate 101 by taking each electromagnetic generating unit 106 as a solenoid as an example. It should be understood that, the orthographic projection on the first substrate 101 may be regarded as the orthographic projection on the surface of the first substrate 101.

As shown in FIG. 2B, the orthographic projections of the plurality of electromagnetic generating units 106 on the first substrate 101 may be arranged in a matrix, such as a matrix of rows and columns. It should be understood that, such an arrangement is not intended to be a limit to the present disclosure. For example, in other implementations, the orthographic projections of the plurality of electromagnetic generating units 106 on the first substrate 101 may be arranged in other manners such as a concentric ring arrangement.

For example, a magnetic field that drives the magnetic fluid 106 to form a Fresnel zone plate pattern may be generated by controlling the voltage applied to the plurality of electromagnetic generating units 106. In some embodiments, a plurality of thin film transistors (TFTs) may be disposed in the first substrate 101. Each TFT is connected to at least one electromagnetic generating unit. Thus, a voltage may be applied to one or more corresponding electromagnetic generating units 106 via each TFT. For instance, taking the electromagnetic generating unit 106 as a solenoid as an example, one end of the solenoid may be connected to a TFT (positive terminal+), and the other end of the solenoid may be connected to the ground (negative terminal−). In some embodiments, the electromagnetic generating unit 106 may be disposed to generate a magnetic field perpendicular to a surface of the first substrate 101 in a case where a voltage is applied. For example, the solenoid may be disposed to spirally extend in a direction perpendicular to the surface of the first substrate 101. The magnetic field perpendicular to the surface of the first substrate 101 more easily controls the distribution of the magnetic fluid 105, thus the magnetic fluid forms a more accurate Fresnel zone plate pattern. It should be understood that, here, a magnetic field perpendicular to a surface of the first substrate 101 may also be regarded as a magnetic field perpendicular to a plane where the first substrate 101 is located.

In a case where no voltage is applied to the plurality of electromagnetic generating units 106, the magnetic fluid 106 is uniformly distributed in the cavity 104. In this case, the terahertz wave is absorbed or reflected by the magnetic fluid 106 and cannot pass through the cavity 104.

By controlling the voltage applied to the plurality of electromagnetic generating units 106, the electromagnetic generating units 106 with a voltage applied and the electromagnetic generating units 106 with no voltage applied may be distributed in a Fresnel zone plate pattern, that is, the annular rings formed by the electromagnetic generating units 106 with a voltage applied and the annular rings formed by the electromagnetic generating units 106 with no voltage is applied are concentrically and alternately arranged. In this case, the electromagnetic generating units 106 with a voltage applied will generate a magnetic field. Under the influence of the magnetic field, the magnetic fluid 106 will gather above the electromagnetic generating units 106 with a voltage applied and appear to be generally distributed in a circular shape. An annular ring channel through which the terahertz wave can pass may be formed above the electromagnetic generating units 106 with no voltage applied. In this way, the magnetic fluid 106 may form a Fresnel zone plate pattern.

For example, a voltage applied to a plurality of electromagnetic generating units 106 disposed on the first side (i.e., the side of the first substrate 101 close to the second substrate 102) may be individually controlled, such that among the plurality of electromagnetic generating units 106 disposed on the first side, annular rings formed by electromagnetic generating units 106 with a voltage applied and annular rings formed by electromagnetic generating units 106 with no voltage applied are distributed in a Fresnel zone plate pattern.

For another example, a voltage applied to a plurality of electromagnetic generating units 106 disposed on the second side (i.e., the side of the first substrate 101 away from the second substrate 102) may be individually controlled, such that among the plurality of electromagnetic generating units 106 disposed on the second side, annular rings formed by electromagnetic generating units 106 with a voltage applied and annular rings formed by electromagnetic generating units 106 with no voltage applied are distributed in a Fresnel zone plate pattern.

For still another example, a voltage applied to a plurality of electromagnetic generating units 106 disposed on the first side and the second side may be simultaneously controlled, such that among the plurality of electromagnetic generating units 106, annular rings formed by electromagnetic generating units 106 with a voltage applied and annular rings formed by electromagnetic generating units 106 with no voltage applied are distributed in a Fresnel zone plate pattern. It should be understood that, the plurality of electromagnetic generating units 106 disposed on the first side and the second side comprise at least one electromagnetic generating unit 106 disposed on one of the first side and the second side, and other electromagnetic generating units 106 disposed on the other of the first side and the second side.

The principles of changing the focal length of the lens assembly by changing half wave zone radii of a Fresnel zone plate pattern will be described in detail below in conjunction with FIGS. 3A and 3B.

Figure 3A:
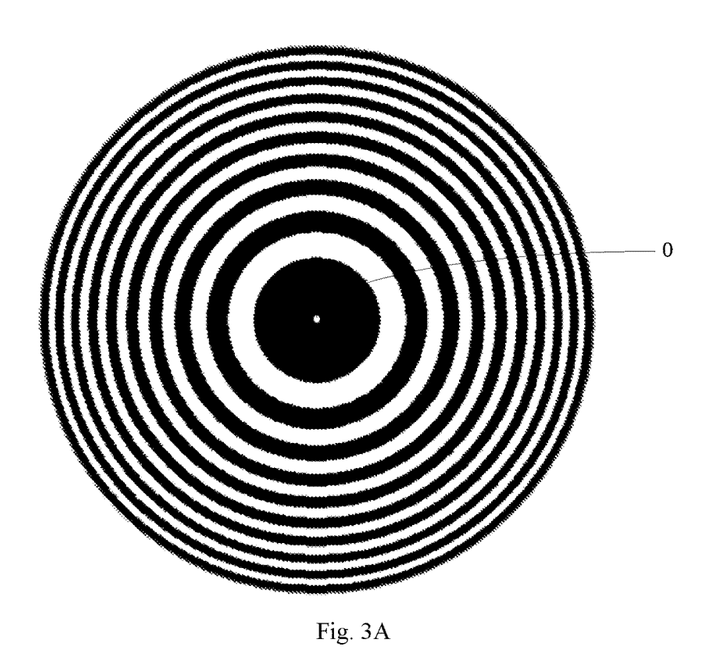
FIG. 3A is a schematic view showing a Fresnel zone plate pattern.

FIG. 3A is a schematic view showing a Fresnel zone plate pattern.

As shown in FIG. 3A, the black circular rings and the white circular rings are alternately arranged with O as the circle center. It should be noted that, the white dot in the center is simply intended to show the position of the circle center O. Here, the first circular ring is the first white circular ring closest to the circle center O, the second ring is the first black circular ring adjacent to the first white circular ring, and so forth. The radius $\rho_k$ of the k-th half wave zone is half of the inner diameter of the k-th ring, k=1, 2, 3 . . . .

Figure 3B:
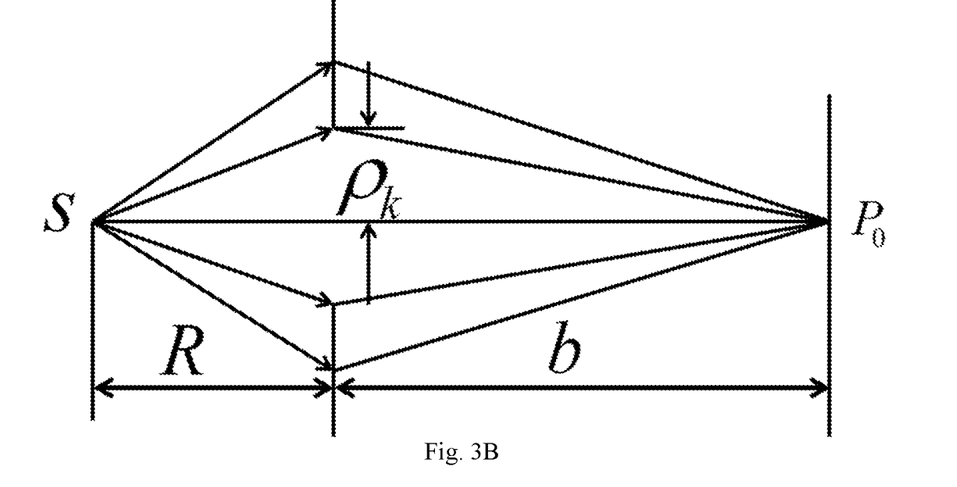
FIG. 3B is a schematic view showing imaging of a lens assembly.

FIG. 3B is a schematic view showing imaging of a lens assembly.

In FIG. 3B, S is a point light source (e.g., a terahertz wave light source), R is an object distance (i.e., a distance between the point light source S and the lens assembly), b is an image distance (i.e., a distance between the lens assembly and the imaging point P0), and $\rho_k$ is the radius of the k-th half wave zone.

According to the optical principles of the Fresnel zone plate, the following formulas (1) and (2) may be obtained:

$$\rho_k = \sqrt{\frac{Rb}{R+b}k\lambda} = \sqrt{k}\,\rho_1 (k = 1, 2, 3, \ldots) \quad (1)$$

$$\frac{1}{R} + \frac{1}{b} = \frac{1}{f} = \frac{\lambda}{\rho_1^2} \quad (2)$$

According to the formulas (1) and (2), the formula (3) may be obtained:

$$f = \frac{\rho_k^2}{k\lambda} = \frac{\rho_1^2}{\lambda} \quad (3)$$

In the above formulas (1), (2), and (3), $\lambda$ is the wavelength of the light emitted by the point light source S, and f is the focal length of the lens assembly.

According to the formula (3), the focal length f is related to the radius $\rho_k$ of the half wave zone and wavelength $\lambda$. In a case where the wavelength $\lambda$ is constant, the focal length of the lens assembly may be adjusted by adjusting the radius $\rho_k$ of the half wave zone. In addition, in a case where the radius $\rho_k$ of the half wave zone is constant, the light with different wavelengths may be focused at different focal points.

In some implementations, the dimension of the electromagnetic generating unit 106 (e.g., the radius of the solenoid) may be set to be much smaller than the radius $\rho_k$ of the half wave zone of the Fresnel zone plate pattern formed by electromagnetic generating units 106 with a voltage applied and electromagnetic generating units 106 with no voltage applied. Thus, the shape of the electromagnetic generating unit 106 will not have a great impact on the Fresnel zone plate pattern.

In some embodiments, the plurality of electromagnetic generating units 106 may be symmetrically disposed on both sides of the first substrate 101.

In this case, a voltage applied to a plurality of electromagnetic generating units 106 located on the first side and a plurality of electromagnetic generating units 106 located on the second side may be simultaneously controlled, such that among the plurality of electromagnetic generating units 106 disposed on the first side, annular rings formed by electromagnetic generating units 106 with a voltage applied and annular rings formed by electromagnetic generating units 106 with no voltage applied are distributed in a first Fresnel zone plate pattern, and such that among the plurality of electromagnetic generating units 106 disposed on the second side, annular rings formed by electromagnetic generating units 106 with a voltage applied and annular rings formed by electromagnetic generating units 106 with no voltage applied are distributed in a second Fresnel zone plate pattern. Here, the second Fresnel zone plate pattern and the first Fresnel zone plate pattern are substantially the same. In this way, the magnetic field generated by the electromagnetic generating units 106 with a voltage applied located on the first side and the magnetic field generated by the electromagnetic generating units 106 with a voltage applied located on the second side will be superimposed together to obtain a magnetic field with enhanced strength, which is favorable to better control the distribution of the magnetic fluid 105.

In the above embodiments, the voltage applied to the plurality of electromagnetic generating units 106 disposed on the first side or the second side may be controlled individually, or the voltage applied to the plurality of electromagnetic generating units 106 disposed on the first side and the plurality of electromagnetic generating units 106 disposed on the second side may be controlled simultaneously. In some cases, for example, in a case where the plurality of electromagnetic generating units 106 disposed on one of the first side and the second side do not work normally, the voltage applied to the plurality of electromagnetic generating units 106 disposed on the other of the first side and the second side may be controlled individually to generate a magnetic field that makes the magnetic fluid 105 form a Fresnel zone plate pattern. In this way, the reliability of the lens assembly may be improved.

Figure 4A:
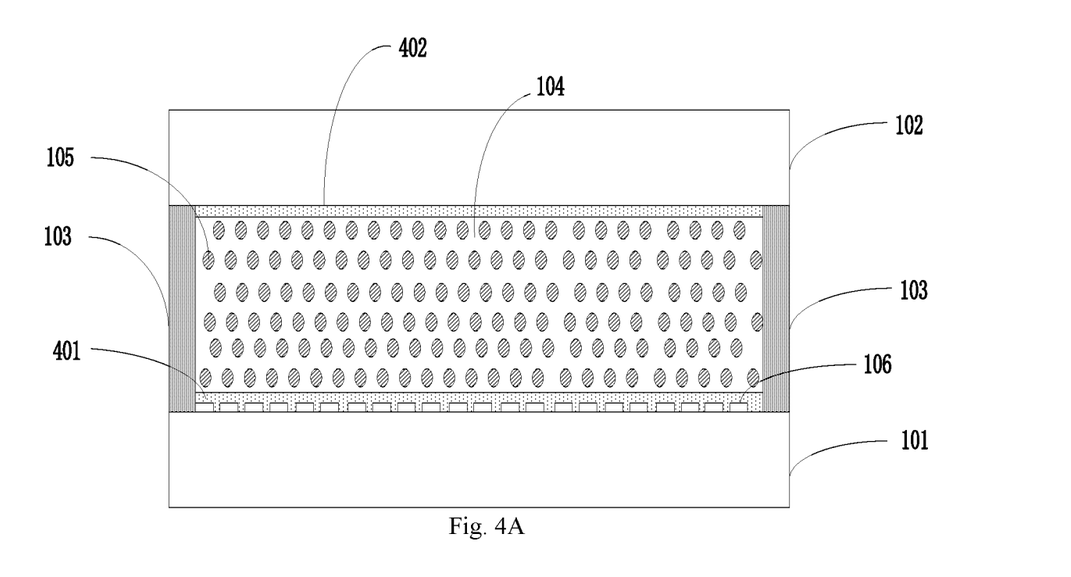
FIG. 4A is a schematic structural view showing a lens assembly according to yet another embodiment of the present disclosure.

FIG. 4A is a schematic structural view showing a lens assembly according to yet another embodiment of the present disclosure.

The lens assembly shown in FIG. 4A differs from the lens assembly shown in FIG. 1A in further comprising at least one of a first insulating layer 401 or a second insulating layer 402.

In some embodiments, referring to FIG. 4A, at least one electromagnetic generating unit 106 is disposed on the side, that is, the first side, of the first substrate 101 close to the second substrate 102. In this case, the lens assembly may further comprise a first insulating layer 401 such as polyimide (PI) or the like between the electromagnetic generating unit 106 disposed on the first side and the magnetic fluid 105. Here, the first insulating layer 401 covers the electromagnetic generating unit 106 disposed on the first side. The first insulating layer 401 can ensure the insulation between the magnetic fluid 105 and the electromagnetic generating unit 106 to avoid direct contact between the magnetic fluid 105 and the electromagnetic generating unit 106 in a case where the magnetic fluid 105 is conductive. Thus, the voltage applied to the electromagnetic generating unit 106 will not be applied to the magnetic fluid. In addition, the first insulating layer 401 may also lessen the influence of static electricity in the first substrate 101 on the distribution of the magnetic fluid 105.

In some embodiments, referring to FIG. 4A, the lens assembly may further comprise a second insulating layer 402, such as polyimide, disposed between the second substrate 102 and the magnetic fluid 105. The second insulating layer 402 may lessen the influence of static electricity in the second substrate 102 on the distribution of the magnetic fluid 105.

In one or more embodiments, the lens assembly may comprise both the first insulating layer 401 and the second insulating layer 402. The first insulating layer 401 and the second insulating layer 402 may confine a magnetic field generated by the plurality of electromagnetic generating units 106 in the cavity 104 to better control the distribution of the magnetic fluid 105.

In some embodiments, a plurality of electromagnetic generating units in the lens assembly may be disposed on a side of the second substrate 102 close to the first substrate 101, and at least one of the first side of the first substrate 101 close to the second substrate 102 or the second side of the first substrate 101 away from the second substrate 102.

Figure 4B:
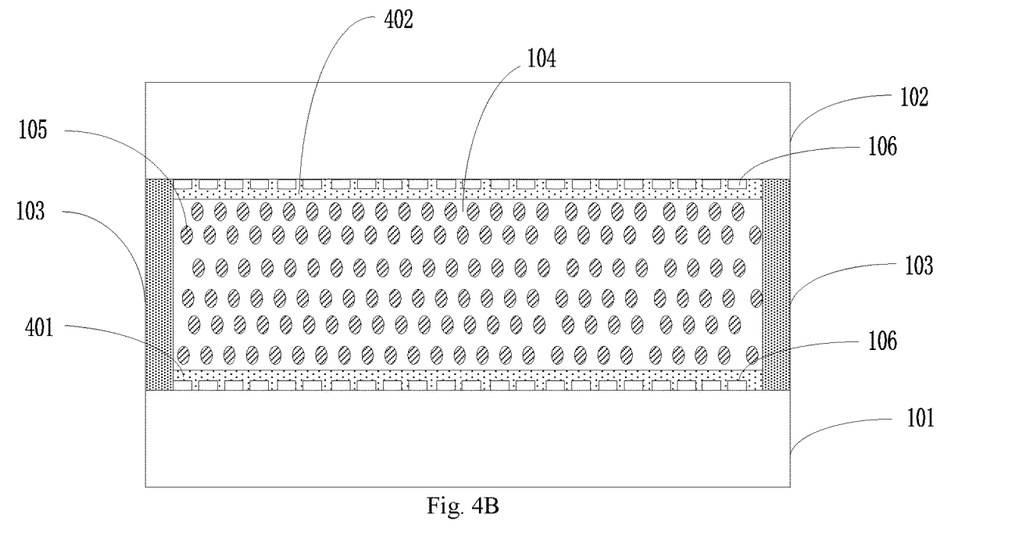
FIG. 4B is a schematic structural view showing a lens assembly according to yet still another embodiment of the present disclosure.

FIG. 4B is a schematic structural view showing a lens assembly according to yet still another embodiment of the present disclosure.

As shown in FIG. 4B, a plurality of electromagnetic generating units in the lens assembly may be disposed on the first side of the first substrate 101 close to the second substrate 102 and the side of the second substrate 102 close to the first substrate 101.

It should be noted that, although FIG. 4B shows both the first insulating layer 401 and the second insulating layer 402, this is not restrictive. For example, in some embodiments, a plurality of electromagnetic generating units in the lens assembly may be disposed on the first side of the first substrate 101 close to the second substrate 102 and the side of the second substrate 102 close to the first substrate 101, while the lens assembly may not comprise the first insulating layer 401 and the second insulating layer 402, or may comprise one of the first insulating layer 401 and the second insulating layer 402.

The lens assembly of each of various embodiments of the present disclosure may be applied to, but not limited to, fields such as terahertz filter, terahertz security inspector, and terahertz non-destructive imaging.

The present disclosure also provides a terahertz wave tomography system. The terahertz wave tomography system may comprise the lens assembly according to any one of the above embodiments. The lens assembly is configured to receive a terahertz wave and focus a terahertz wave transmitted through the lens assembly at a position to be imaged of the sample to be imaged.

Some applications of the lens assembly will be introduced below in conjunction with the embodiments shown in FIGS. 5 to 7.

Figure 5:
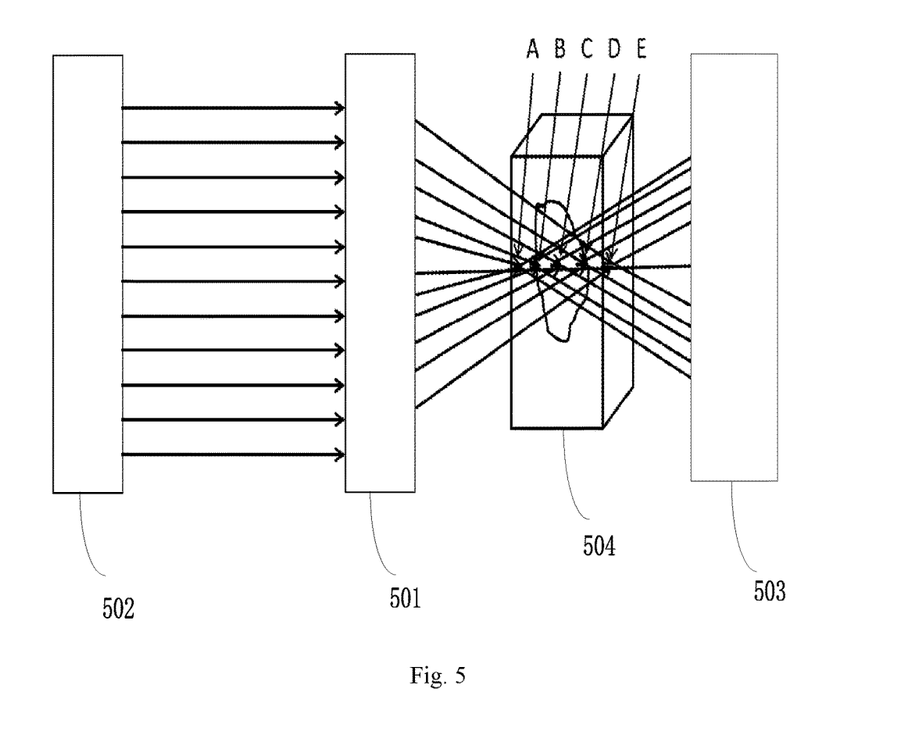
FIG. 5 is a schematic structural view showing a terahertz wave tomography system according to an embodiment of the present disclosure.

FIG. 5 is a schematic structural view showing a terahertz wave tomography system according to an embodiment of the present disclosure.

As shown in FIG. 5, the terahertz wave tomography system comprises a lens assembly 501 according to any one of the above embodiments, a transmitter 502, and a processing device 503.

The transmitter 502 is configured to transmit a terahertz wave (referred to a first terahertz wave) to the lens assembly 501.

The lens assembly 502 is configured to receive the first terahertz wave and focus a terahertz wave (referred to a second terahertz wave) transmitted through the lens assembly 502 at a position to be imaged (e.g., A, B, C, D, or E) of the sample to be imaged 504.

The processing device 503 is configured to receive and process a terahertz wave (referred to a third terahertz wave) transmitted through the sample to be imaged 504 to obtain an image of the position to be imaged. For example, the image of a position to be imaged may be obtained based on the intensity, phase or the like of the terahertz wave transmitted through the sample to be imaged 504.

Next, the operation principles of the tomography system will be introduced.

The voltage applied to the plurality of electromagnetic generating units 106 in the lens assembly 501 is controlled to make the magnetic fluid 105 form a Fresnel zone plate pattern. After a terahertz wave of a fixed wavelength is transmitted by the transmitter 502 to the lens assembly 501, a terahertz wave transmitted through the magnetic fluid 105 will focused at a position to be imaged, for example, the position A, of the sample to be imaged 504. By changing the radii of the half wave zones of the Fresnel zone plate pattern formed by the magnetic fluid 105 in the lens assembly 501, the focal length of the lens assembly 501 may be changed, so that the terahertz wave transmitted through the magnetic fluid 105 is focused at different positions, such as B, C, D or E, of the sample to be imaged 504. Here, A, B, C, D, and E are on the same straight line.

According to the above manner, the terahertz wave can be focused at different positions of the sample to be imaged 504 along the same straight line. By adjusting the position of the sample to be imaged 504, the terahertz wave can be focused at different positions along other straight lines of the sample to be imaged 504. In this way, images of different positions to be imaged can be obtained, that is, tomography is achieved.

In the tomography system of the above embodiments, since the lens assembly has a variable focal length, the terahertz wave can be focused at different positions of the sample to be imaged. Thus, images of different positions to be imaged can be obtained and tomography is achieved.

Figure 6:
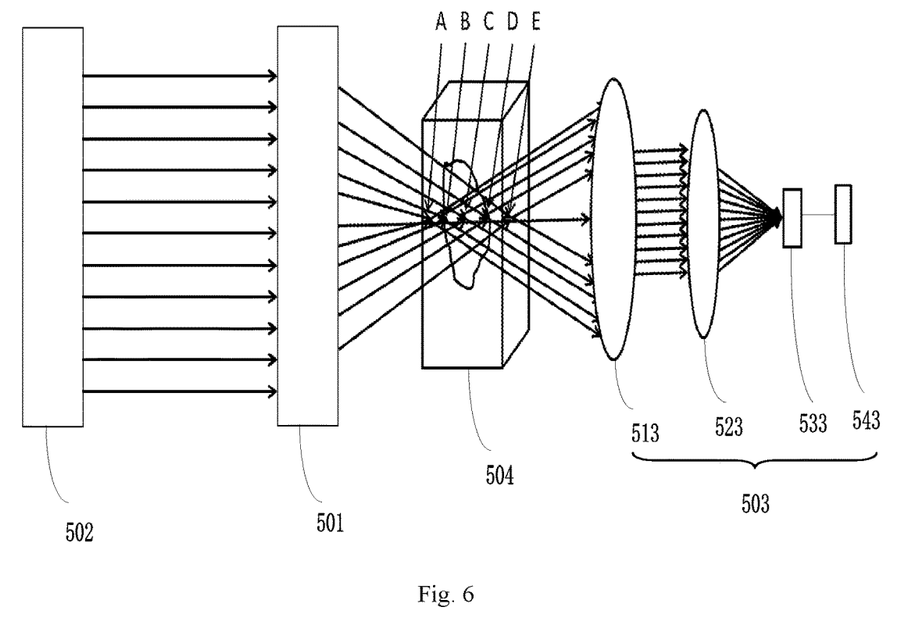
FIG. 6 is a schematic structural view showing a terahertz wave tomography system according to another embodiment of the present disclosure.

FIG. 6 is a schematic structural view showing a terahertz wave tomography system according to another embodiment of the present disclosure.

As shown in FIG. 6, the processing device 503 of the tomography system may comprise a collimator 513 (e.g., a collimating lens), a focuser 523 (e.g., a focusing lens), a receiver 533, and a processor 543.

The collimator 513 is configured to collimate a terahertz wave (i.e., a third terahertz wave) transmitted through the sample to be imaged 504. The focuser 523 is configured to focus the terahertz wave collimated by the collimator 513. The receiver 533 is configured to receive the terahertz wave focused by the focuser 523. The processor 543 is configured to process the terahertz wave focused by the focuser 523 to obtain an image of a position to be imaged.

It should be noted that, the processing device 503 is not limited to the specific implementation shown in FIG. 6. For example, in some implementations, the processing device 503 may additionally comprise other members, which will not be listed in detail here.

Figure 7:
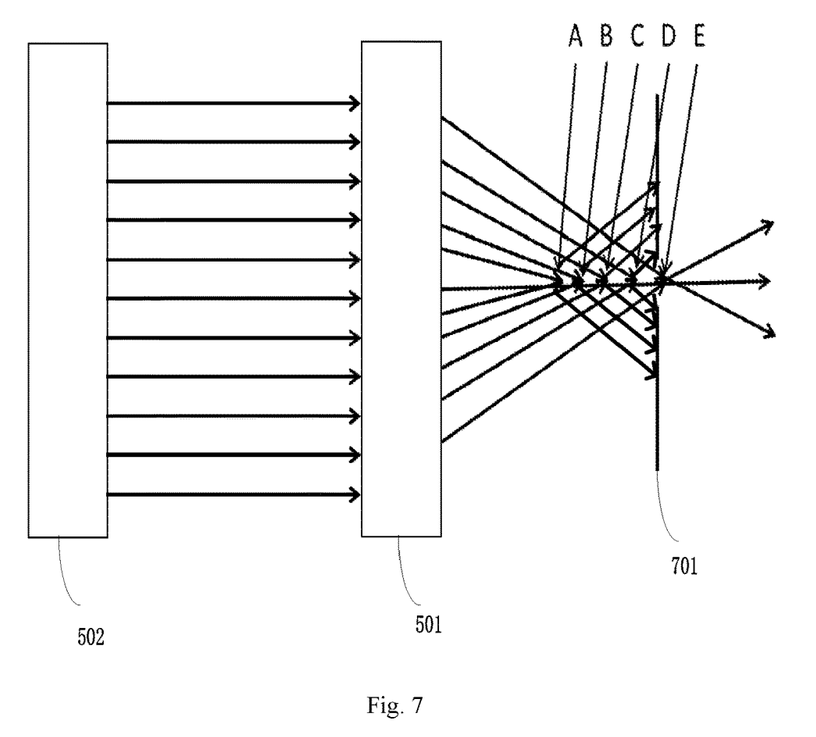
FIG. 7 is a schematic structural view showing a terahertz wave filter according to an embodiment of the present disclosure.

FIG. 7 is a schematic structural view showing a terahertz wave filter according to an embodiment of the present disclosure.

As shown in FIG. 7, the terahertz wave filter comprises a lens assembly 501 and an aperture stop 701 located on the light emitting side of the lens assembly. The lens assembly 501 is configured to receive terahertz waves of a plurality of wavelengths and focus a terahertz wave of a predetermined wavelength of the terahertz waves of the plurality of wavelengths at the aperture stop 701. In some embodiments, the terahertz wave filter may further comprise a transmitter 502 configured to transmit the terahertz waves of a plurality of wavelengths to the lens assembly 501.

For example, terahertz waves of different wavelengths may focus at different positions, such as A, B, C, D, and E, after passing through the lens assembly 501. An aperture stop 701 is disposed at the position E, and a terahertz wave (i.e., a terahertz wave with a predetermined wavelength) focused at the position E may pass through the aperture stop 701, while terahertz waves focused at other positions cannot pass through the aperture stop 701. Thus, the terahertz waves are filtered.

Figure 8:
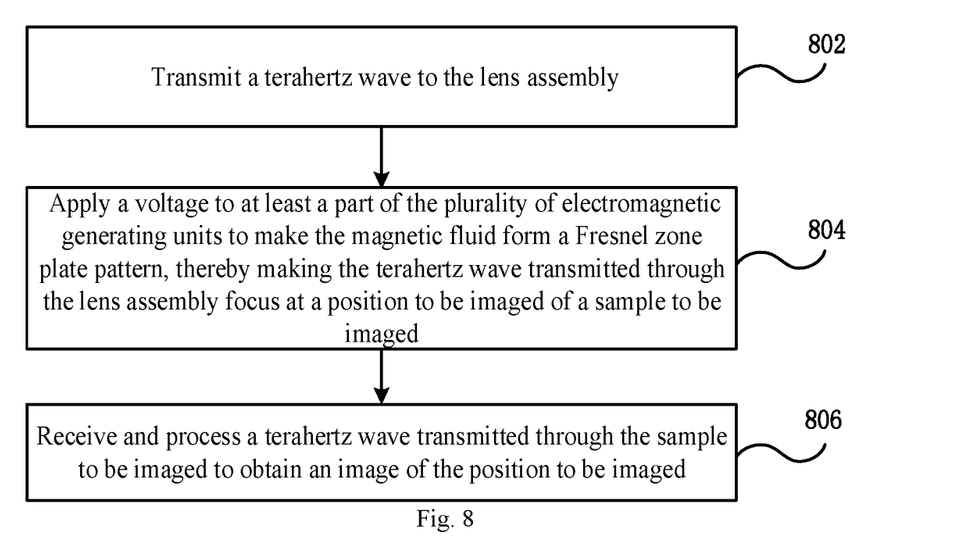
FIG. 8 is a schematic flowchart showing a terahertz wave tomography method according to an embodiment of the present disclosure.

FIG. 8 is a schematic flowchart showing a terahertz wave tomography method according to an embodiment of the present disclosure.

At step 802, a terahertz wave (i.e., a first terahertz wave) is transmitted to the lens assembly according to any one of the above embodiments.

At step 804, a voltage is applied to at least a part of the plurality of electromagnetic generating units to make the magnetic fluid form a Fresnel zone plate pattern, thereby making the terahertz wave (i.e., a second terahertz wave) transmitted through the lens assembly focus at a position to be imaged of a sample to be imaged.

In some embodiments, among the plurality of electromagnetic generating units, electromagnetic generating units with a voltage applied and the other electromagnetic generating units with no voltage applied are distributed in a Fresnel zone plate pattern. Here, the electromagnetic generating units with a voltage applied generate a magnetic field that makes the magnetic fluid in the lens assembly form a Fresnel zone plate pattern. Thus, the magnetic fluid in the lens assembly forms a Fresnel zone plate pattern.

In other embodiments, the plurality of electromagnetic generating units may be arranged to be distributed in a Fresnel zone plate pattern. In this case, a voltage may be applied to all of the plurality of electromagnetic generating units to generate a magnetic field that makes the magnetic fluid in the lens assembly form a Fresnel zone plate pattern. Thus, the magnetic fluid in the lens assembly forms a Fresnel zone plate pattern.

At step 806, a terahertz wave (i.e., a third terahertz wave) transmitted through the sample to be imaged is received and processed to obtain an image of a position to be imaged.

In some implementations, the terahertz wave transmitted through the sample to be imaged may be processed according to the following manner: first, the terahertz wave transmitted through the sample to be imaged is collimated; then, the collimated terahertz wave is focused; after that, the focused terahertz wave is processed to obtain the image of the position to be imaged.

In the above embodiments, by changing the focal length of the lens assembly, the terahertz wave may be focused at different positions of the sample to be imaged. Thus, images of different positions to be imaged can be obtained and tomography is achieved.

In some embodiments, the step 804 in FIG. 8 may be implemented in the following manner.

A voltage is applied to a first part of the plurality of electromagnetic generating units to make the magnetic fluid form a first Fresnel zone plate pattern, thereby making the terahertz wave transmitted through the lens assembly focus at a first position to be imaged of the sample to be imaged.

A voltage is applied to a second part of the plurality of electromagnetic generating units to make the magnetic fluid form a second Fresnel zone plate pattern, thereby making the terahertz wave transmitted through the lens assembly focus at a second position to be imaged of the sample to be imaged.

Here, the second part of electromagnetic generating units comprise at least one electromagnetic generating unit different from each of the first part of electromagnetic generating units. That is, the second part of electromagnetic generating units and the first part of electromagnetic generating units are not exactly the same. Thus, the radius of the first half wave zone of the second Fresnel zone plate pattern formed is different from the radius of the first half wave zone of the first Fresnel zone plate pattern formed, so that the second position to be imaged is different from the first position to be imaged.

In this way, the position to be imaged can be changed, and images of different positions to be imaged can be obtained.

Figure 9:
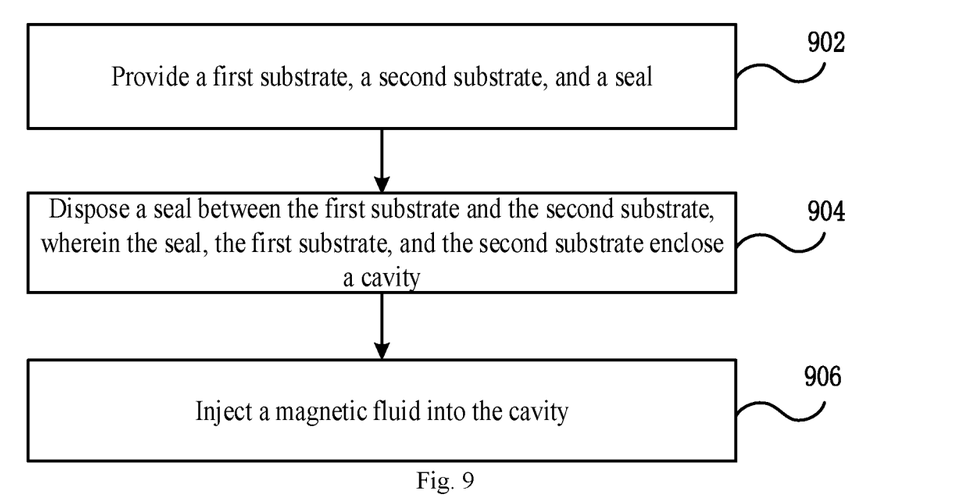
FIG. 9 is a schematic flowchart showing a method for manufacturing a lens assembly according to an embodiment of the present disclosure.

FIG. 9 is a flowchart showing a method for manufacturing a lens assembly according to an embodiment of the present disclosure.

At step 902, a first substrate, a second substrate, and a seal are provided. Here, at least one side of the first substrate is provided with a plurality of electromagnetic generating units, such as a plurality of solenoids.

In some embodiments, the plurality of electromagnetic generating units is disposed on only one side of the first substrate. In some embodiments, the plurality of electromagnetic generating units and a first insulating layer covering the plurality of electromagnetic generating units are disposed on only one side of the first substrate.

In other embodiments, the plurality of electromagnetic generating units may be disposed on both sides of the first substrate. That is, a part of the plurality of electromagnetic generating units are disposed on one side of the first substrate, and the other electromagnetic generating units are disposed on the other side of the first substrate. In some embodiments, the plurality of electromagnetic generating units may be symmetrically disposed on both sides of the first substrate.

At step 904, a seal is disposed between the first substrate and the second substrate to make the seal, the first substrate, and the second substrate enclose a cavity.

For example, after the cavity is formed, an opening may be disposed at a predetermined position of the cavity for subsequent injection of the magnetic fluid.

In some embodiments, one side of the second substrate may be provided with a second insulating layer. After the cavity is formed, the second insulating layer faces the first substrate.

At step 906, a magnetic fluid is injected into the cavity to form a lens assembly.

The manufacturing method shown in FIG. 9 is only schematic, and the lens assembly may be also formed in other manners by those skilled in the art according to the teaching of the present disclosure. For example, a magnetic fluid is dripped on one side of the first substrate provided with a plurality of electromagnetic generating units on one side, a sealant is coated on one side of the second substrate, and then the first substrate and the second substrate are attached to form a lens assembly.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A lens assembly, comprising:
   a first substrate and a second substrate that are oppositely disposed;
   a seal, which encloses a cavity with the first substrate and the second substrate, wherein a magnetic fluid is filled in the cavity; and
   a plurality of electromagnetic generating units disposed on at least one of a first side of the first substrate close to the second substrate or a second side of the first substrate away from the second substrate, wherein at least a part of the plurality of electromagnetic generating units are configured to generate a magnetic field, in a case where a voltage is applied, to make the magnetic fluid form a Fresnel zone plate pattern.

2. The lens assembly according to claim 1, wherein at least one of the plurality of electromagnetic generating units comprises a solenoid.

3. The lens assembly according to claim 1, wherein orthographic projections of the plurality of electromagnetic generating units on the first substrate are arranged in concentric rings.

4. The lens assembly according to claim 3, wherein the orthographic projections of the plurality of electromagnetic generating units on the first substrate are arranged in the Fresnel zone plate pattern.

5. The lens assembly according to claim 1, wherein orthographic projections of the plurality of electromagnetic generating units on the first substrate are arranged in a matrix.

6. The lens assembly according to claim 1, wherein at least one of the plurality of electromagnetic generating units is disposed on the first side; and
   wherein the lens assembly further comprises:
   a first insulating layer disposed between the at least one of the plurality of electromagnetic generating units and the magnetic fluid and covering the T.

7. The lens assembly according to claim 1, further comprising:
   a second insulating layer disposed between the second substrate and the magnetic fluid.

8. The lens assembly according to claim 1, wherein at least one of the plurality of electromagnetic generating units is disposed on the second side; and
   further comprising:
   a protective layer covering the at least one of the plurality of electromagnetic generating units.

9. The lens assembly according to claim 1, wherein the plurality of electromagnetic generating units is disposed symmetrically with respect to the first substrate.

10. The lens assembly according to claim 1, wherein a direction of the magnetic field is perpendicular to a plane where the first substrate is located.

11. The lens assembly according to claim 1, wherein a plurality of thin film transistors is disposed in the first substrate, and each of plurality of thin film transistors is connected to at least one of the plurality of electromagnetic generating units.

12. The lens assembly according to claim 1, wherein the plurality of electromagnetic generating units is disposed on a side of the second substrate close to the first substrate, and at least one of the first side or the second side.

13. The lens assembly according to claim 12, wherein the plurality of electromagnetic generating units is disposed on the side of the second substrate close to the first substrate and the first side.

14. A terahertz wave tomography system, comprising: the lens assembly according to claim 1, configured to receive a first terahertz wave and focus a second terahertz wave transmitted through the lens assembly at a position to be imaged of a sample to be imaged.

15. The terahertz wave tomography system according to claim 14, further comprising:
a transmitter configured to transmit the first terahertz wave to the lens assembly; and
a processing device configured to receive and process a third terahertz wave transmitted through the sample to be imaged to obtain an image of the position to be imaged.

16. The terahertz wave tomography system according to claim 15, wherein the processing device comprises:
a collimator configured to collimate the third terahertz wave transmitted through the sample to be imaged;
a focuser configured to focus the third terahertz wave collimated by the collimator;
a receiver configured to receive the third terahertz wave focused by the focuser; and
a processor configured to process the terahertz wave focused by the focuser to obtain the image of the position to be imaged.

17. A terahertz wave filter, comprising the lens assembly according to claim 1 and an aperture stop located on a light exiting side of the lens assembly, wherein the lens assembly is configured to receive terahertz waves of a plurality of wavelengths and focus a terahertz wave of a predetermined wavelength of the terahertz waves of the plurality of wavelengths at the aperture stop.

18. A terahertz wave tomography method, comprising:
transmitting a first terahertz wave to a lens assembly, wherein the lens assembly comprises:
a first substrate and a second substrate that are oppositely disposed,
a seal, which encloses a cavity with the first substrate and the second substrate, wherein a magnetic fluid is filled in the cavity, and
a plurality of electromagnetic generating units disposed on at least one of a first side of the first substrate close to the second substrate or a second side of the first substrate away from the second substrate;
applying a voltage to at least a part of the plurality of electromagnetic generating units to make the magnetic fluid form a Fresnel zone plate pattern, thereby making a second terahertz wave transmitted through the lens assembly focus at a position to be imaged of a sample to be imaged; and
receiving and processing a third terahertz wave transmitted through the sample to be imaged to obtain an image of the position to be imaged.

19. The terahertz wave tomography method according to claim 18, wherein the at least a part of the plurality of electromagnetic generating units and other electromagnetic generating units of the plurality of electromagnetic generating units with no voltage applied are distributed in the Fresnel zone plate pattern.

20. The terahertz wave tomography method according to claim 19, wherein the position to be imaged comprises a first position to be imaged and a second position to be imaged; and
wherein the step of applying the voltage comprises:
applying the voltage to a first part of the at least a part of the plurality of electromagnetic generating units to make the magnetic fluid form a first Fresnel zone plate pattern, thereby making the second terahertz wave transmitted through the lens assembly focus at the first position to be imaged of the sample to be imaged; and
applying the voltage to a second part of the at least a part of the plurality of electromagnetic generating units to make the magnetic fluid form a second Fresnel zone plate pattern, thereby making the second terahertz wave transmitted through the lens assembly focus at the second position to be imaged of the sample to be imaged,
wherein the second part of the at least a part of the plurality of electromagnetic generating units comprise at least one electromagnetic generating unit different from each of the first part of the at least a part of the plurality of electromagnetic generating units, so that a radius of a first half wave zone of the second Fresnel zone plate pattern is different from a radius of a first half wave zone of the first Fresnel zone plate pattern.

* * * * *